United States Patent [19]

Strametz et al.

[11] 4,161,574

[45] Jul. 17, 1979

[54] PROPYLENE-TERPOLYMERS

[75] Inventors: Helmut Strametz; Kurt Rust, both of Frankfurt am Main, Fed. Rep. of Germany

[73] Assignee: Hoechst Aktiengesellschaft, Frankfurt am Main, Fed. Rep. of Germany

[21] Appl. No.: 826,711

[22] Filed: Aug. 22, 1977

[30] Foreign Application Priority Data

Aug. 24, 1976 [DE] Fed. Rep. of Germany ....... 2637990

[51] Int. Cl.$^2$ ........................ C08F 4/64; C08F 210/08
[52] U.S. Cl. ................................ 526/159; 526/348.6

[58] Field of Search ............................... 526/159, 348.6

[56] References Cited

U.S. PATENT DOCUMENTS 3,959,409  5/1976  Frese et al. ...................... 526/348.6

*Primary Examiner*—Alan Holler
*Attorney, Agent, or Firm*—Curtis, Morris & Safford

[57] ABSTRACT

A polypropylene having a strongly reduced melting temperature and improved optical properties is obtained by copolymerization of propylene with small quantities of ethylene and butene-(1).

1 Claim, No Drawings

PROPYLENE-TERPOLYMERS

It is known that ethylene, propylene and higher α-olefins and mixtures thereof can be polymerized in the presence of complex metal-organic mixed catalysts. For this purpose, combinations of compounds of the elements of the 1st to 3rd main group with those of the 4th to 6th side group of the Periodic System are used and sometimes also a third component. The molecular weight of the polymers produced with these catalysts in suspension, solution or in the gaseous phase, can be regulated by the addition of suitable regulating substances and with the aid of the reaction temperature to a range of from 50,000 to 5,000,000 units.

Highly stereospecific catalyst systems are known which permit the transformation of propylene under suitable reaction conditions to more than 95 percent into an isotactic, i.e., crystallizable, polymer. The advantageous mechanical properties such as high hardness, stiffness and dimensional stability of the articles made from such material are due to the high degree of crystallinity. In addition, isotactic polypropylene has the advantage of having a high softening point $T_m$ of about 170° C. However, there are also applications for polypropylene, where a low melting point is desired, for example in the coating of paper and card-boards and of polypropylene foils by co-extrusion. In the first case, the application on the substrate must be facilitated, whereas in the second case the sealing of the multi-layer foil can be carried out at a lower temperature.

A lower melting point can be obtained by introducing a comonomer into the polypropylene chain; the expected effects can be estimated by the quantity and regularity of the introduction of the comonomer.

In most cases, ethylene and higher α-olefins are used as comonomers, it being important that they are distributed as far as possible ("statistically") in the polypropylene chain.

Copolymers of propylene with statistically distributed ethylene are well known for a long time. The connection between the composition of such products and their crystallinity are likewise known.

In addition to the reduction of the melting temperature $T_m$ of polypropylene, a reduction of the crystallinity and an increase of the optical transparency of the shaped articles prepared therefrom can be observed.

Copolymers of propylene and butene-(1) are also known.

Furthermore, copolymers of propylene and 7 to 25% by weight of butene-(1) with reduced second order transition temperature are known (cf. U.S. Pat. No. 2,918,457).

Furthermore, there have been described crystalline statistical copolymers of butene-(1) with 5 to 50% by weight of propylene, which are distinguished over pure polybutene-(1) by their better crystallization behavior. (Cf. British patent specification No. 1,084,953).

Finally, the preparation of copolymers of propylene with butene-(1) has been described, in which the use of highly stereo-specific catalyst systems yields copolymers with segmental order.

Copolymers with low melting point being suitable for coating purposes are obtained by copolymerization with butene-(1). The polymers are precipitated from the reaction mixture by the addition of methanol, whereupon they are obtained in the form of course aggregates, which are difficult to process (cf. German patent specification No. 1,230,224).

In the known processes for the preparation of statistical copolymers for extrusion coating and for hollow articles, the production on an industrial scale involves many difficulties. In the copolymerization process, the proportion of polymer dissolved in the polymerization mother liquor is higher than in homopolymerization processes, which raises problems, especially if ethylene is used as comonomer. Stickings and deposits in the apparatus for the isolation of the solid copolymer and for the purification of the dispersion agent used cause operation failures. In addition, they include losses of material, because the products dissolved in the dispersion agent can be sold to a limited degree only after its separation. In gas-phase polymerizations, sticky layers on the product prepared are formed so that the polymer particles are baked together. When butene-(1) or higher α-olefins are used, not only the difficulties described for ethylene-copolymers occur, but moreover, by reason of reactivity, the rates of introduction of these comonomers are low. Due to the only partial reaction of the comonomers, higher material losses occur than those due to the proportions dissolved in the mother liquor alone. Owing to the relatively high prices of the higher α-olefins (including butene-(1)), these factors have an especially unfavorable influence on the production costs.

It has now been found that a polypropylene with a strongly reduced melting temperature and improved optical properties can be prepared in a particularly favorable manner by using a combination of two comonomers in low concentrations.

Thus, the present invention relates to a propylene terpolymer consisting of
  93.2 to 99.0% by weight of propylene units,
  0.5 to 1.9% by weight of ethylene units and
  0.5 to 4.9% by weight of butene-(1) units with an essentially statistical distribution of the comonomers and to a process for preparing it.

The polymer according to the present invention consists of
  93.2 to 99.0% by weight of propylene units,
  0.5 to 1.9% by weight of ethylene units and
  0.5 to 4.9% by weight of butene-(1) units, preferably of
  94.5 to 96.5% by weight of propylene units,
  0.5 to 1.5% by weight of ethylene units and
  2.0 to 4.0% by weight of butene-(1) units, with essentially statistical comonomer distribution and mainly crystalline character.

The melting temperature is lower by at least 10° C. than that of polypropylene and the RSV value is in the range of from 1.5 to 15, preferably 2.0 to 10 dl/g.

Owing to the preponderately crystalline character, the products have to a large degree the good mechanical properties of polypropylene so that they may be used in the processing methods usual for polypropylene, for example in injection molding, extrusion, extrusion blowing and compression molding as well as whirl sintering. In addition they are extraordinarily suitable for extrusion coating, for example of paper-board, paper and card-board, on which they produce hard surfaces with a high gloss.

The quantity and/or viscosity in solution of the polymer proportion dissolved in the polymerization medium are lower than in a propylene-ethylene copolymer with a comparable melting range.

Thus, the polymer suspension can be better stirred and pumped and the polymer powder can be more easily separated from the mother liquor. The above-mentioned difficulties during production are surmounted and the losses of material strongly reduced. With the exception of additional dosage installations for the comonomers, the terpolymers can be prepared in the same production installation as those used for isotactic homopolymers of propylene.

In the gas-phase polymerization, stickiness and tendency to agglomerate of the products according to the invention are lower.

For the preparation of the terpolymers of the invention, known highly stereo-specific catalyst systems may be used, for example a combination of a $TiCl_3$-containing component which has been prepared by reducing $TiCl_4$ with aluminum or aluminum diethyl chloride or aluminum ethyl sesquichloride, subjected to a thermal after-treatment and containing aluminum diethyl monochloride as activator. A $TiCl_3$ component after-treated with complexing compounds may also be used or the stereospecificity of the catalyst system may be increased by the addition of so-called third components to the polymerization mixture, or both measures may be combined (cf. German Offenlegungsschriften Nos. 1,495,629, 2,409,726 and 2,413,261).

Another $TiCl_3$-component may also be used, insofar as it yields, in combination with the above-mentioned activator, a highly stereospecific catalyst system, for example, the commercial catalyst components of the composition $TiCl_3 \cdot \frac{1}{3}AlCl_3$ alone or in combination with complex forming agents to increase the stereospecificity.

Suitable complexing compounds are, for example, ethers, thioethers, thiols, phosphines, amines, amides, ketones, esters, especially ethers of the formula R—O—R, wherein R represents an alkyl radical of 1 to 15 carbon atoms. Suitable third components for increasing the stereospecificity are, for example, cyclopolyene and phosphoric acid amides, especially cycloheptatriene and hexamethyl-phosphoric acid trisamide.

It is also possible to use a catalyst system which consists of the reaction product of $TiCl_4$ with a magnesium chloride and/or magnesium alcoholate-containing compound, an aluminum trialkyl and a compound which is an electron donor, for example an organic ester or amine.

As activator, metal-organic compounds of the formula $MR_qX_{p-q}$, wherein M is a metal of the I., II., III. or IV. side group of the Periodic System, preferably aluminum and zinc, especially aluminum, R is a hydrocarbon radical having from 1 to 16 carbon atoms, preferably an alkyl radical having from 2 to 12 carbon atoms, X is hydrogen, a halogen atom or alkoxy or dialkylamine radicals having from 1 to 8 carbon atoms, p has the same valency as M and q is a whole number corresponding to $1 \leq q \leq p$.

Particularly suitable for chlorine-containing aluminum organic compounds such as dialkyl aluminum monochlorides of the formula $AlR_2Cl$ or alkylaluminum sesquichlorides of the formula $Al_2R_3Cl_3$, wherein R is defined as above. Examples thereof are $Al(C_2H_5)_2Cl$, $Al(iC_4H_9)_2Cl$, $Al_2(C_2H_5)_3Cl_3$.

It is likewise of advantage to use as component B aluminum trialkyls of the formula $AlR_3$ or aluminum dialkylhydrides of the formula $AlR_2H$, wherein R is defined as above, preferably $Al(C_2H_5)_3$, $Al(C_2H_5)_2H$, $Al(C_3H_7)_3$, $Al(iC_4H_9)_3$, $Al(iC_4H_9)_2H$.

Suitable aluminum-organic compounds are furthermore the reaction products of aluminum trialkyls or aluminum dialkylhydrides containing alkyl radicals of 1 to 16 carbon atoms, with dienes containing 4 to 20 carbon atoms. It is preferred to use the reaction products of aluminum trialkyls or aluminum dialkylhydrides, the alkyl radicals of which contain 4 to 8 carbon atoms, with phellandrene or a diene of the formula

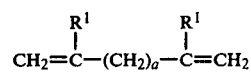

wherein $R^1$ represents hydrogen, an alkyl radical, an alkenyl radical containing an inner-positioned double linkage or a mononucleic aryl radical and $a = 0$ or 1. Examples of such dienes are 1,4-butadiene, isoprene, 2-phenyl-butadiene, 1,4-pentadiene, 1,3-pentadiene, and myrcene. It is particularly preferred to use the reaction products of $Al(iC_4H_9)_3$ or $Al(iC_4H_9)_2H$ with isoprene. To these reaction products belong, for example products of the formula

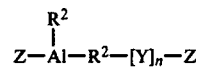

wherein Y represents the groups

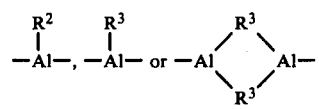

Z is hydrogen, the isobutyl group, the dihydroisoprenyl group or an oligomer of this group, $R^2$ represents the isobutyl radical, $R^3$ represents the tetrahydroisoprenylene radical and n is an integer of 1 to 20. The ratio between the $C_5$ and the $C_4$ radicals in the reaction products of $Al(iC_4H_9)_3$ or $Al(iC_4H_9)_2H$ with isoprene may generally be in the range of from 0.25 to 10, preferably of from 1 to 4. Especially preferred is a compound of this type which commercially available under the designation "aluminum isoprenyl".

The preparation of the polymers according to the invention is carried out in an inert diluent or in the gaseous phase. Suitable diluents are, for example: aliphatic or cycloaliphatic hydrocarbons, such as pentane, hexane, cyclohexane, methylcyclohexane. Furthermore there may be used aromatic hydrocarbons such as benzene, xylene, or gasoline or hydrogenated diesel oil fractions which have been thoroughly freed from oxygen, sulfur compounds and humidity.

The catalyst concentration and the temperature and pressure conditions are chosen to correspond to those which are customary for a propylene homopolymerization using the same catalyst system.

The process is carried out under a pressure of from 0.5 to 40 kg/cm², preferably of from 1 to 35 kg/cm². The reaction temperature is in the range of from 40° to 90° C., preferably of from 50° to 85° C. and especially of from 55° to 80° C. Propylene and comonomers are added during the total polymerization period and with constant weight ratios. Ethylene and butene-(1) are fed with a weight ratio smaller than 1, preferably of from 0.1 to 0.8. It has been ascertained that the quantity and the viscosity in solution of the polymer proportion dissolved in the polymerization medium are lower than in the case of a propylene-ethylene copolymer having a comparable melting range.

For regulating the molecular weight and, as a consequence thereof, the melt viscosity of the polymer, in addition to the selection of suitable reaction temperatures, hydrogen is used, advantageously which is admixed to the monomers to be introduced into the reaction batch in such a way that a quantity thereof of 0.1 to 20% by volume, calculated on propylene, in the gaseous zone is maintained.

The quantity of $TiCl_3$-containing catalyst component depends on the activity and the reaction conditions, especially on the pressure and temperature. The molar ratio between Ti and aluminum is chosen to be in the usual range of from 1:1 to 1:5 or higher, depending on the degree of purity of the monomers and of the dispersion agent.

Working up of the suspension obtained at the end of the polymerization may be carried out in a usual manner, for example by treating it with a suitable alcohol, which is capable of dissolving the catalyst residues. Thereupon it may be washed with water, filtered, and dried, or the residues of the dispersion agent may be removed by steam distillation with subsequent drying. Working up the powder obtained in the gas-phase polymerization may be done in an analogous manner, by suspending the powder in a mixture of hydrocarbon and alcohol. The composition of the terpolymer may be determined by means of the infrared spectroscopy, the ethylene content being indicated on the band at 13.65 $\mu$m (732 cm$^{-1}$) and the butene content at 13.05 $\mu$m (766 cm$^{-1}$).

The melting temperature is determined by means of the Differential Scanning Calorimetry (DSC). To obtain reproducible values, the samples are first heated at a speed of 32° C./minute and thereafter cooled at a speed of 64° C./minute. Thereupon the melt point maxima of the samples are determined at a heating rate of 4° C./minute.

The RSV-values are determined in solutions of 0.1% by weight of polymer in decahydronaphthalene at 135° C. and are indicated in deci-liters per gram (dl/g).

The melt indices MFI 230/5 are determined according to ASTM D 1238-62 T.

The following Examples illustrate the invention:

EXAMPLE 1

Preparation of the $TiCl_3$ catalyst component C 1:

1090 l of a hydrogenated gasoline fraction (boiling point of from 140° to 165° C.) free from oxygen and 550 ml of titanium tetrachloride (5 mols) are placed into a 10 liter stirring vessel, with the exclusion of air and humidity, and at 0° C., a solution of 1111.2 g of aluminum ethyl sesquichloride (containing 4.5 mols of aluminum diethyl chloride) in 3334 g of the gasoline fraction is added dropwise while stirring with a speed of 250 r.p.m., within a period of 8 hours under a nitrogen atmosphere. There is formed a reddish-brown fine precipitate. Stirring is thereafter continued for 2 hours at 0° C. and for 12 hours at room temperature.

Thereafter the suspension is heated to 90° C. for 4 hours and subsequently for a further 6 hours to 110° C. After having settled, the precipiate is separated from the supernatant mother liquor by decantation and washed five times with each time 2000 ml of the gasoline fraction. The washed solid reaction product is again suspended in the gasoline fraction and the suspension is adjusted to a concentration of 2 mols of $TiCl_3$/liter. The content of trivalent titanium in the solution is determined by titration with a Ce(IV) solution.

Polymerization 100 liters of a hydrogenated aliphatic hydrocarbon having a boiling range of from 140° to 170° C. are placed into an enamelled 150 liter vessel provided with an impeller stirrer, heated to 58° C. and saturated with the monomers under a propylene pressure of 0.5 bar. After addition of 0.5 mol of aluminum diethyl chloride (5 mmols/l) and 0.5 mol of $TiCl_3$ in the form of the $TiCl_3$-containing component C 1 (5 mmols/l) polymerization starts immediately.

35 kg of propylene (=5 kg/h), 0.735 kg of ethylene (=0.105 kg/h) and 1.106 kg of butene-(1) (=0.158 kg/h) are introduced in the course of 7 hours. The molecular weight of the terpolymer is regulated by the addition of 2.5 liters of hydrogen per hour. Upon completion of the monomer feed, the contents of the vessel are allowed to react for another 30 minutes. The slight overpressure still prevailing in the vessel is released. The components of the catalyst are decomposed with 3 liters of iso-propanol, for 4 hours, at 70° C. The organic phase is extracted four times with 30 liters of demineralized water. The polymer suspension is then filtered at a temperature in the range of from 50° to 65° C. and the polymer is dried. Yield: 33.5 kg. Melt index MFI 230° C./5=17 g/10 minutes, RSV-value 2.80 dl/g. Content of the mother liquor of soluble polymer 7.4% by weight, calculated on the total amount of polymer. RSV-value of the polymer isolated from the mother liquor 0.21 dl/g.

The ball indentation hardness and the results of the DSC measurings with regard to the crystallinity temperature and the melting point maxima can be seen in the following table.

EXAMPLES 2 AND 3

It is operated as in Example 1, using different quantities of comonomers (cf. data in the table).

EXAMPLE 4

Preparation of the $TiCl_3$-catalyst component C 2:

1090 ml of a hydrogenated gasoline fraction (boiling point of from 140° to 165° C.) free from oxygen and 550 ml of titanium tetrachloride (5 mols) are placed into a 10 liter stirring vessel with the exclusion of air and humidity, and at 0° C., a solution of 1111.2 g of aluminum ethyl sesquichloride (containing 4.5 mols of aluminum diethyl monochloride) in 3334 g of the gasoline fraction are added dropwise while stirring at a speed of 250 revolutions per minute, for a period of 8 hours, under a nitrogen atmosphere. A reddish-brown fine precipitate is separated. Thereafter stirring is continued for 2 hours at 0° C., for 12 hours at room temperature and for 4 hours at 60° C. The dispersion agent is then siphoned off and replaced by fresh gasoline. After stirring, this treatment is repeated twice, whereby the suspension is adjusted to a content of $TiCl_3$ of 2 mols/liter. Thereafter 0.8 liter (=4.74 mols) of Di-n-butyl ether are added dropwise while stirring at 65° C. within a period of 30 minutes. After another hour, there are added 39 ml (=0.375 mol) of cycloheptatriene (−1,3,5), whereupon stirring is continued for further 4 hours at 70° C. After cooling, the dispersion agent is removed and the solid catalyst component is washed three times with 2.5 liters of the gasoline fraction.

Polymerization

A 50 liter reactor made of stainless steel, which is equipped with a stirrer, a jacket heating and a gas inlet tube is flushed with pure nitrogen at room temperature and subsequently with propylene. Thereafter a pressure of 0.5 bar hydrogen is set up, whereupon 10 liters of liquid propylene, 90 mmols of $Al(C_2H_5)_2Cl$ and a suspension consisting of 9 mmols of $TiCl_3$ in the form of the $TiCl_3$-containing catalyst component C 2 and 4.5 mmols of cycloheptatriene-(1,3,5) in 15 ml of hexane are added through a valve. Thereafter 20 liters of liquid propylene are added. The reactor is then heated to an internal temperature of 45° C. in the course of 10 minutes, while the introduction of 37 g of ethylene and 123.3 g of butene-(1) per hour is started. The inner pressure mounts to 23 bars thereby, and the inner temperature to 55° C. This temperature is maintained by cooling. Four hours after having attained the polymerization temperature, the reaction is interrupted by pressure release of the vessel. The polymer powder is then stirred for 2 hours at 50° C. with 30 liters of an azeotropic mixture of hexane and isopropanol (in a ratio 77:23 parts by weight). After filtration and drying there are obtained 9.2 kg of a free-flowing polymer powder.

C. while stirring and propylene containing 0.2% by volume of $H_2$ is added for 4 hours at a rate of 1.1 kg/h as well as ethylene at a rate of 0.017 kg/h and finally butene-(1) at a rate of 0.023 kg/h. The final pressure of 17 kg/cm² is reduced to 4.5 kg/cm² by polymerization. The propylene partial pressure is reduced by releasing the residual quantity of propylene and by adding nitrogen.

The polymer mixture is withdrawn from the reactor under a nitrogen atmosphere and treated subsequently in a 50 liter vessel while stirring with 30 liters of an azeotropic mixture of 77% by weight of n-hexane and 27% by weight of iso-propanol, for one hour, at 65° C. The polymer powder is then freed from the dispersion agent on a pressure filter and dried under nitrogen. Yield 4.1 kg. Content of the extraction agent of soluble polymer which has a RSV-value of 0.22 dl/g 4.3% by weight. The product properties can be seen from the following table.

COMPARATIVE EXAMPLES A, B and C

Example 1 is repeated using one time no butene-(1) (=comparative example A), one time no ethylene (=comparative example B) and one time no comonomer. The results are listed in the following table.

| Example/ Comp. Ex. | COMONOMER-offer | | COMONOMER-content | | melt index MFI 230°/5 [g/10 min] | RSV-value [dl/2] | soluble proportion in mother liquor % by weight | RSV-value of the sol. prop. in the mother liquor [dl/g] | PSC-measurings | | ball indentation hardness (N/mm) |
|---|---|---|---|---|---|---|---|---|---|---|---|
| | $C_2$ % by weight | $C_4$ % by weight | $C_2$ % by weight | $C_4$ % by weight | | | | | $C_A$ for 64°/min [°C.] | $M_p$ for 4°/min [°C.] | |
| 1 | 2.0 | 3.0 | 1.7 | 2.3 | 17 | 2.8 | 7.4 | 0.21 | 79 | 137/147 | 54 |
| 2 | 1.0 | 5.0 | 0.9 | 3.4 | 13 | 3.01 | 3.2 | 0.15 | 82 | 142/151 | 59 |
| 3 | 1.0 | 2.5 | 0.9 | 1.6 | 16 | 2.85 | 2.9 | 0.19 | 87 | 146/155 | 66 |
| 4 | 1.5 | 5.0 | 1.3 | 3.4 | 12 | 3.11 | (5.5) | (0.20) | 76 | 137/152 | 59 |
| 5 | 1.5 | 2.0 | 1.5 | 1.6 | 21 | 2.64 | (4.3) | (0.22) | 84 | 143/152 | 61 |
| A | 3.5 | — | 3.0 | — | 18 | 2.66 | 7.1 | 0.39 | 77 | 138/148 | 55 |
| B | — | 8.0 | — | 4.3 | 13 | 3.10 | 5.1 | 0.23 | 87 | 154 | 56 |
| C | — | — | — | — | 17 | 2.60 | 1.3 | 0.27 | 99 | 166 | 76 |

()Extraction with hexane/isopropyl alcohol azeotrope (77:23 % by weight)

For details of the product properties refer to the following table.

EXAMPLE 5

Gas-phase polymerization

To 0.3 kg of a previously prepared terpolymer powder placed in a lying 20 liter reactor provided with a scraping stirrer there are added 10 mmols of $TiCl_3$ in the form of the component C 2 (refer to Example 4) and 5 mmols of cycloheptatriene(−1,3,5) and 150 mmols of aluminum diethyl monochloride in a small quantity of pentane. The contents of the reactor are heated to 60°

What is claimed is:

1. A process for the preparation of a propylene terpolymer consisting by weight of 93.2 to 99.0% propylene units, 0.5 to 1.9% ethylene units and 0.5 to 4.9% butene-(1) units which comprises copolymerizing propylene, ethylene and butene-(1) in an inert diluent, liquid propylene or in the gaseous phase in the presence of a mixed catalyst consisting of a $TiCl_3$-containing compound and an activator, and maintaining the weight ratio of ethylene to butene-(1) smaller than 1:1 to obtain said terpolymer.

* * * * *